Inventor
DAVID NOEL OBENSHAIN

Patented June 8, 1954

2,680,683

UNITED STATES PATENT OFFICE 2,680,683

CHARGING AND DISCHARGING MECHANISM FOR USE IN CONTINUOUS COOKING OF CHIPS IN THE MANUFACTURE OF PULP

David Noel Obenshain, Piedmont, W. Va., assignor to West Virginia Pulp and Paper Company, New York, N. Y., a corporation of Delaware Application December 6, 1951, Serial No. 260,269

11 Claims. (Cl. 92—7)

In my co-pending application Serial No. 260,268, I describe novel processes for continuous digestion of wood chips in the manufacture of pulp.

The present application deals with an improved material handling device particularly useful for introducing the raw chips into the continuous digester under pressure and removing therefrom the cooked chips.

Many mechanisms for this purpose have been designed and a number of patents have been issued. In practice most of these mechanisms have had many drawbacks. The types which compress chips into an impervious plug—either plunger or screw type—seriously damage the properties of the fiber which is obtained. Other types, mostly modifications of the rotary bucket or "star" valve, suffer from leakage because of the operating clearances necessary in this type of construction and also have the fault of introducing air into the digester with the chips and releasing steam to the air as the empty pockets return to the chip filling position.

My present invention has for its principal object to provide an improved mechanism which will satisfactorily overcome these difficulties, and more specifically to provide such a mechanism of the type comprising a rotary valve which shall be pressure-tight and at the same time have balanced characteristics such that it will not bind when moved to transport material from a region of one pressure to that of a different pressure.

More specific objects of my invention are to accomplish pre-steaming and de-aerating of the chips and the regulated draining of the liquor from the cooked chips.

A still further object is to provide a chip handling device of the type mentioned which will meter the chips into the valve mechanism so as to insure against undue compression of the chips and other damage as by the chips being caught between the moving disk and the stationary surfaces in contact with the moving surfaces of the disk.

Further objects will be apparent as the description proceeds.

As will be apparent from a consideration of the several specific embodiments shown and described herein, the chips drop loosely into a pocket without packing, crushing or shearing and can be treated in a number of ways such as pre-steaming, de-aerating, etc. Because of my improvement, there is no problem of steam or liquor leakage since the valves operate with sealing surfaces in rubbing contact yet without excessive friction.

In its preferred embodiment, my improved mechanism consists of a rotating disk having radially arranged pockets extending from face to face of said disk, said disk operating between two stationary port plates. The port plates have openings, registering with the pockets in the disk, through which the chips are introduced and discharged and through which such operations as pre-steaming the raw chips and draining liquor from the cooked chips can be performed.

The rotating disk type valve per se is not new. Like the bucket type and star type valves, it has always required positive operating clearances with leakage, misalignment and expansion major problems. For this reason disk type transfer valves have never been widely used even for the handling of liquids alone, and to my knowledge have never even been considered for such service as charging chips into a continuous digester.

The disk type valve which I have invented overcomes those previous faults by having the sealing surfaces in intimate rubbing contact at all times and maintained in such contact without undue friction by having one or more of these surfaces free floating. The free floating feature automatically compensates for misalignment, thermal expansion and wear. Furthermore my invention permits balancing of the forces acting on the valve so as to greatly reduce friction as will be explained later.

As above mentioned, crushing of the chips prior to digestion has been shown to have adverse effects on the quality of the pulp produced. For this reason I have devised means for metering chips into the pockets of the rotary valve so that the pockets are never completely filled, thereby minimizing the possibility of chips being crushed and sheared as the pockets move past the inlet port. This also has the advantage of reducing wear on the port plates and disk.

My invention may best be understood by referring to the following detailed description taken with the annexed drawings, in which.

Figure 1:
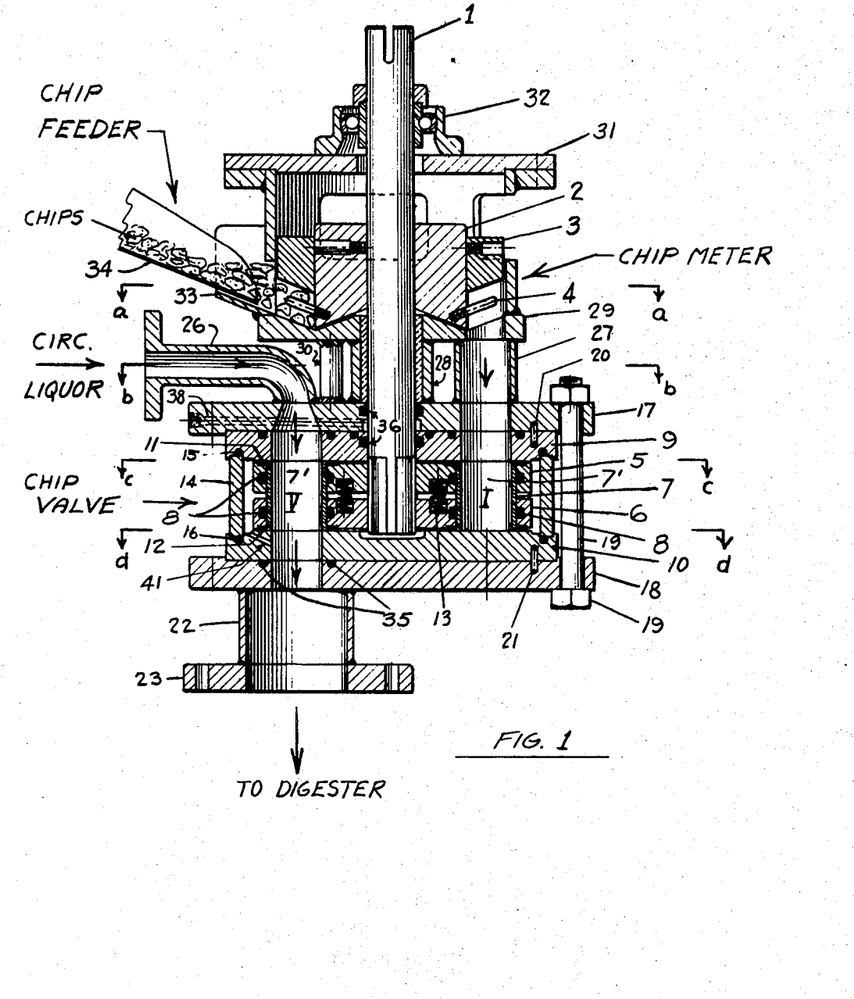
Figure 1 shows in vertical section a preferred embodiment of my improvement in raw chip feeding valves.
Figure 2:
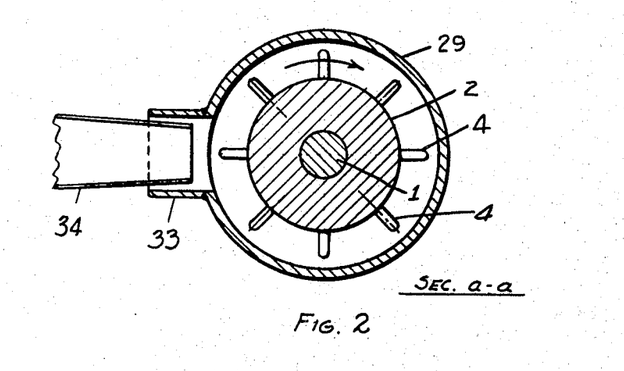
Fig. 2 is a section on $a$—$a$ of Fig. 1 showing the chip metering mechanism.
Figure 3:
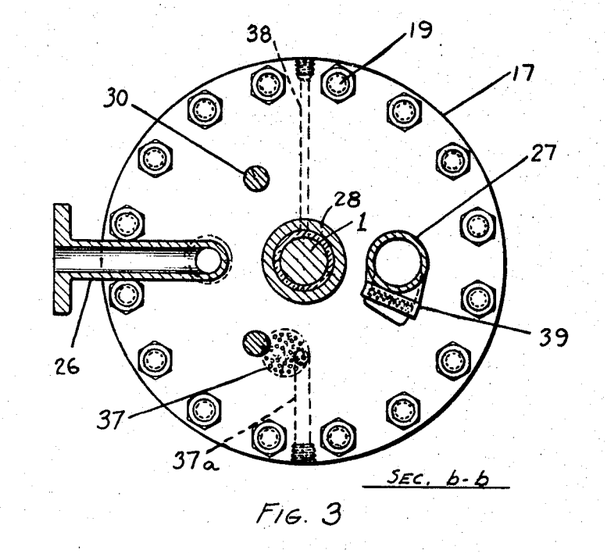
Fig. 3 is a section on $b$—$b$ of Fig. 1 indicating the ports in the top port plate.
Figure 4:
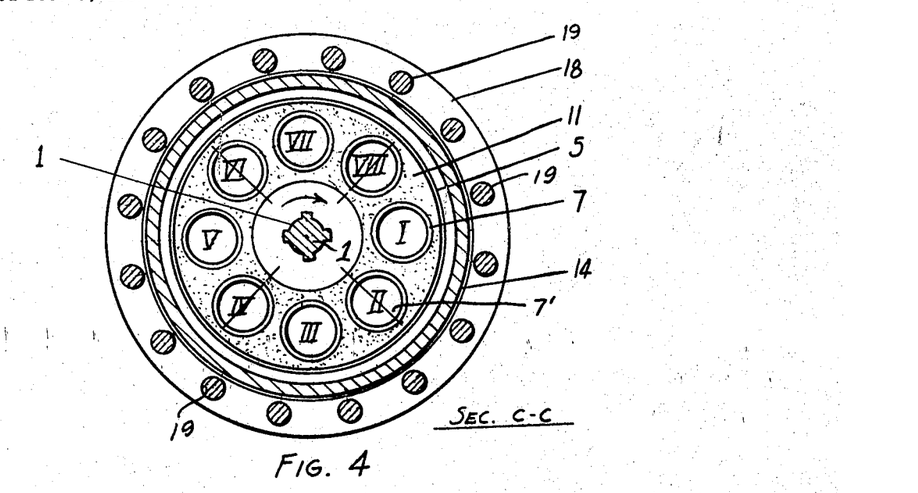
Fig. 4 is a section on $c$—$c$ of Fig. 1 giving a top view of the rotating disk.
Figure 5:
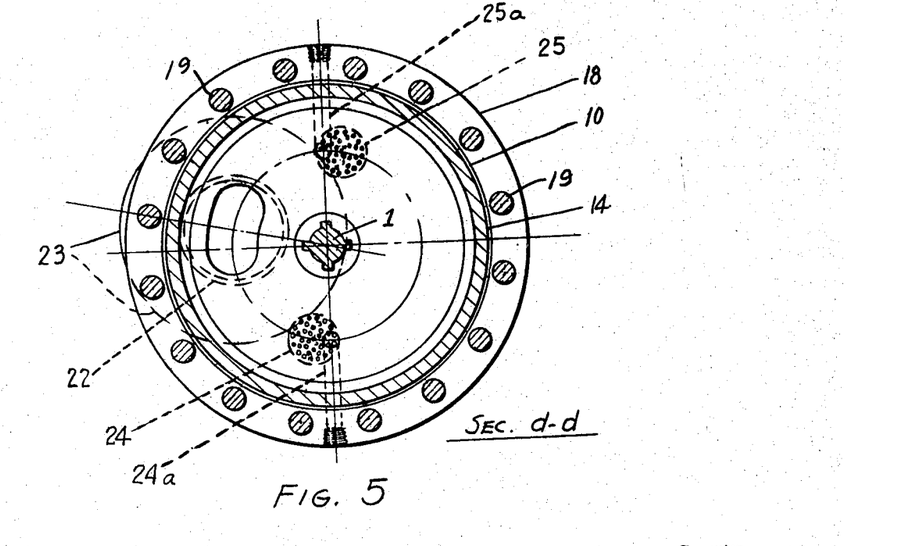
Fig. 5 is a section on $d$—$d$ of Fig. 1 showing the bottom port plate.

Figure 1 together with Figures 2, 3, 4 and 5 illustrate the mechanical details of a preferred embodiment of my mechanism for feeding chips into a digester. Figure 1 shows a vertical section of the mechanism taken at the center-lines of the chip charging and discharging ports. The rotating shaft 1 has mounted on it the chip metering rotor 2 which supports the adjustable chip metering ring 3 and the chip metering fingers 4, and at its bottom it has mounted the valve rotor which comprises a top disk or plate 5 and a bottom disk or plate 6, both splined to the shaft 1 but free to float up and down thereon. In the embodiment shown these top and bottom disks have loosely mounted therein eight sleeves 7 defining pockets 7'. Pressure leakage between the disks and sleeves is prevented by the rubber O-rings 8. The sleeves 7 preferably have a face to face length .005" to .010" less than the space between the port plates 9 and 10, therefore they are not in forced contact with said port plates. The disks 5 and 6 carry, recessed into their faces and projecting slightly beyond their faces, wear plates 11 and 12 of a material having suitable properties. I find that "Teflon," a tetrafluoroethylene resin plastic, gives excellent results for this purpose and can be used in a relatively thin layer. Graphite composition wear faces are also suitable for this service but must be thicker for mechanical strength. Where appropriate materials, such as hardened steel for the port plates 9 and 10 and cast iron for the disks 5 and 6 can be used, wear plates can be eliminated. Springs 13 force the disks apart and insure sealing contact with the port plates.

Port plates 9 and 10 are held apart by annular housing member 14 with pressure tight seal accomplished by means of rubber O-rings 15 and 16. The entire assembly is held between top casing plate 17 and bottom casing plate 18 which in turn are clamped together by tie bolts 19. Dowel pins 20 and 21 prevent rotation of the port plates and insure proper alignment of port openings.

Bottom casing plate 18 has attached thereto a sleeve 22 and flange 23 for discharge of the chips into the digester. It also has channels 24a and 25a, Fig. 5, for steam, as will be explained later.

Top casing plate 17 has attached to its circulating liquor inlet connection 26, chip inlet sleeve 27, shaft bearing 28, and supported above these, chip meter casing 29. Two posts 30 assist in supporting the chip meter casing. Attached to the top of the chip meter casing is bearing support plate 31 and bearing 32. At one side of the chip meter casing is the chip inlet spout 33. The end of a vibrating chip feeder or conveyor 34 is shown feeding chips to the chip meter.

Rubber O-rings 35 provide seals between the port plates and casing plates at all port openings and shaft opening. Rubber O-rings 36 serve as shaft seals. Top casing plate 17 also carries air exhaust channel 37a, Fig. 3, and weep hole 38 for relieving any possible leakage of shaft seals 36.

Structural details in Fig. 1 indicate fabrication by welding. Obviously, castings or other forms of construction could be used.

Figure 6:
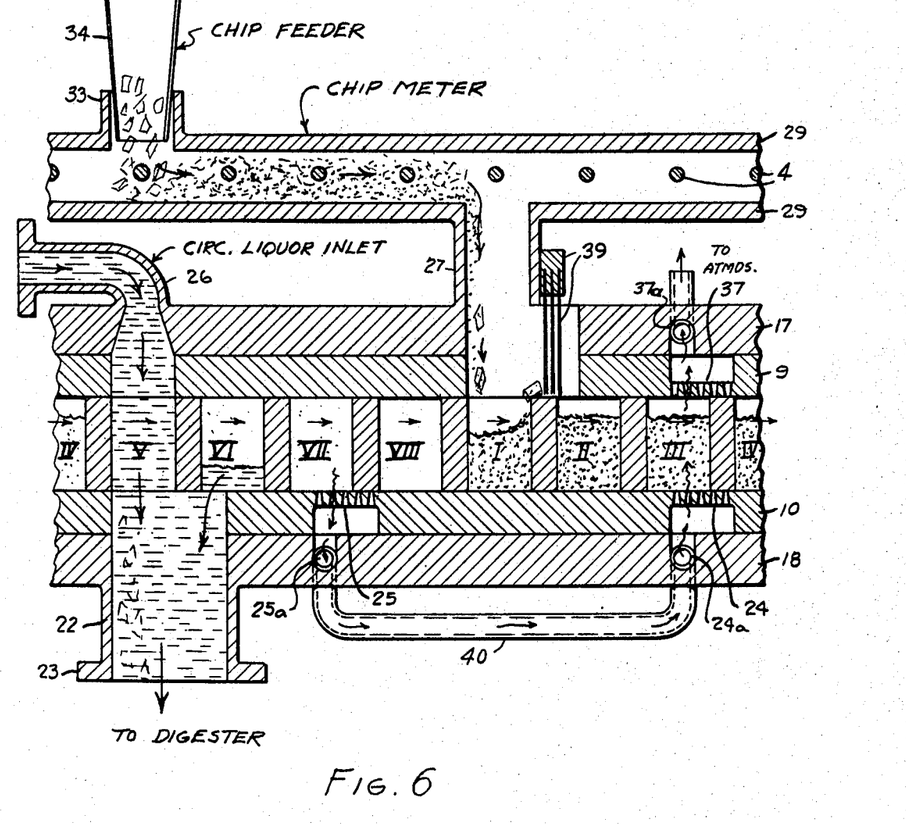
Fig. 6 is a developed view showing the pockets of the disk in sequential order relative to the various port openings, and illustrating how the various operations of the valve are performed.

The multiple operations of the chip feeding mechanism can best be explained by referring to the developed view of Fig. 6. Herein the port numbers are identical with those in Figs. 1, 2, 3, 4 and 5. The Roman numerals in the valve pockets denote the pocket positions rather than the particular pockets. Positions IV at both ends of the diagram are one and the same.

Chips enter the chip meter casing 29 from vibrating feeder 34 at inlet spout 33 and are moved toward the right by chip meter fingers 4, dropping through inlet sleeve 27 into the valve pocket position I. A chip brush 39 sweeps chips off the top of the valve face. In position II the chips enter a sealed position, passing on to position III where steam enters through channel 24a into a strainer section 24 in the bottom port plate 10, flushing the air surrounding the chips out through a similar strainer section 37 in top port plate 9 into exhaust channel 37a. This action also heats and pre-steams the chips. In position IV the chips and steam are sealed in. In position V circulating cooking liquor from inlet 26 flushes the chips out of the pocket and into the digester. Position VI permits liquor trapped in the pocket to drain out by gravity leaving the pocket full of steam only. In position VII the trapped steam is released through a strainer section 25 in bottom port plate 10 into channel 25a and conducted by external pipe 40 to position III where it is used in the pre-steaming operation. Position VIII is the final seal position before restarting the cycle. It will be noted that since the chip metering fingers 4 and the pockets 7' are fastened to the same shaft they travel at the same speed; therefore, if the capacity of the chip metering device represented by the fingers 4 is less than that of the pockets 7', said pockets can never be completely filled and the chips will not be damaged by compression. Further, because of the action of the brush 39 they will not be caught between the moving surfaces and thereby damaged.

Referring to Fig. 1, pressure equalizer duct 41 in lower port plate 10 allows digester pressure to surround completely the exposed surfaces of the valve disk assembly. This pressure tends to aid the springs 13 in providing sealing action in regions around the ports opening to atmospheric pressure. However, due to the force equalizing characteristic of the system of sleeves 7 and sealing rings 8, the extent of this assisting force is not great enough to cause excessive sliding friction between the rotating disk assembly and the port plates.

Figure 13:
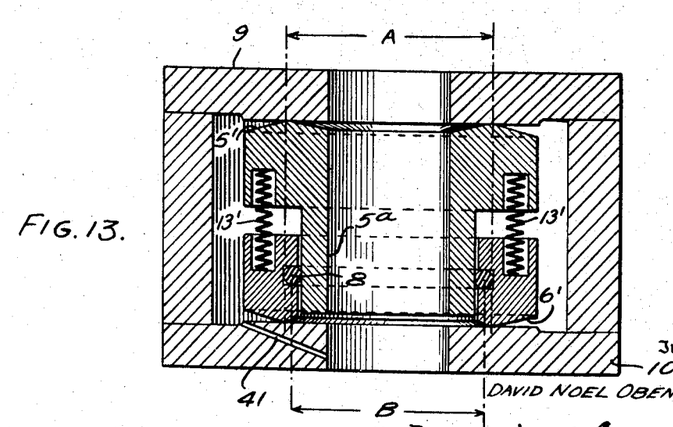
Fig. 13 is a diagrammatic showing explanatory of the forces creating the balanced effect.

An analysis of the forces involved will best be had from a consideration of Figure 13 which indicates somewhat more clearly how the forces are applied. Thus the top ring 5' may be thought of as having a depending skirt 5a forming in part the wall of the port and having a sliding fit with the lower ring 6' with a spring 13' corresponding to spring 13 of Figure 1. Separating the skirt 5a and the ring 6' is the sealing O-ring 8'. This condition would thus be analogous to that obtained if the top ring 5 of Fig. 1 should be stuck and all the sliding action should take place at the bottom seal ring. The top surface of the ring 5' and the bottom surface of the ring 6' are for the purpose of this analysis each considered to make a circular line of contact with the port plate 9, such lines of contact thus being assumed to represent respectively the loci of the forces exerted by the rings 5', 6' against the port plates 9, 10. If A represents the diameter of the circle of contact of the rings 5' and 6' against their respective port plates 9 and 10 and if B represents the diameter of the effective sealing circle between the ring 6' and the sleeve 5a, then, excluding the force exerted by the springs, the unbalanced force F would be given by the following expression:

$$F = [(\text{Area A}) - (\text{Area ``B''})] \times [(\text{Pressure inside casing}) - (\text{Pressure inside pocket})]$$

Since the difference in area is small, the unbalanced force will be small even though the pressure in the pocket in question is only atmospheric. Based on the above, a chip feeding valve for a digester having 45 tons pulp per day capacity, using an eight-pocket disk, pockets 6 inches inside diameter × 8 inches deep on 22½ inch pitch diameter, rotating 10 R. P. M. would requre approximately 10 to 12 hp. for operation.

The more nearly equal the diameters "A" and "B" are, the less the power that will be consumed due to sliding friction. However, it is important that "A" always be slightly greater than "B"; should it be less, the pressure in the valve casing would tend to compress the disk assembly thereby permitting leakage between the disks and port plates. Normally the springs holding the disk assembly apart exert but little force compared to the fluid forces available.

Figure 7:
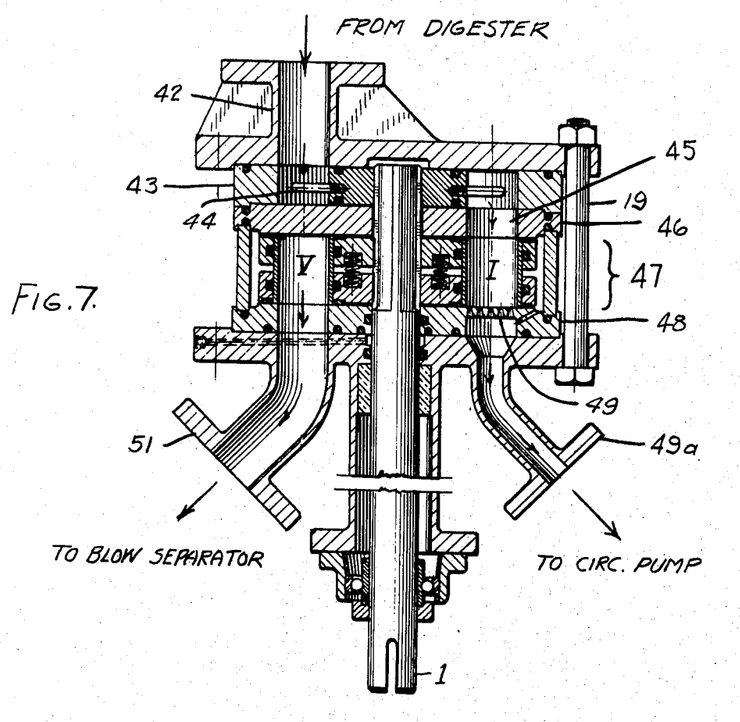
Fig. 7 is a view in vertical section of my improved cooked chip discharge valve.
Figure 8:
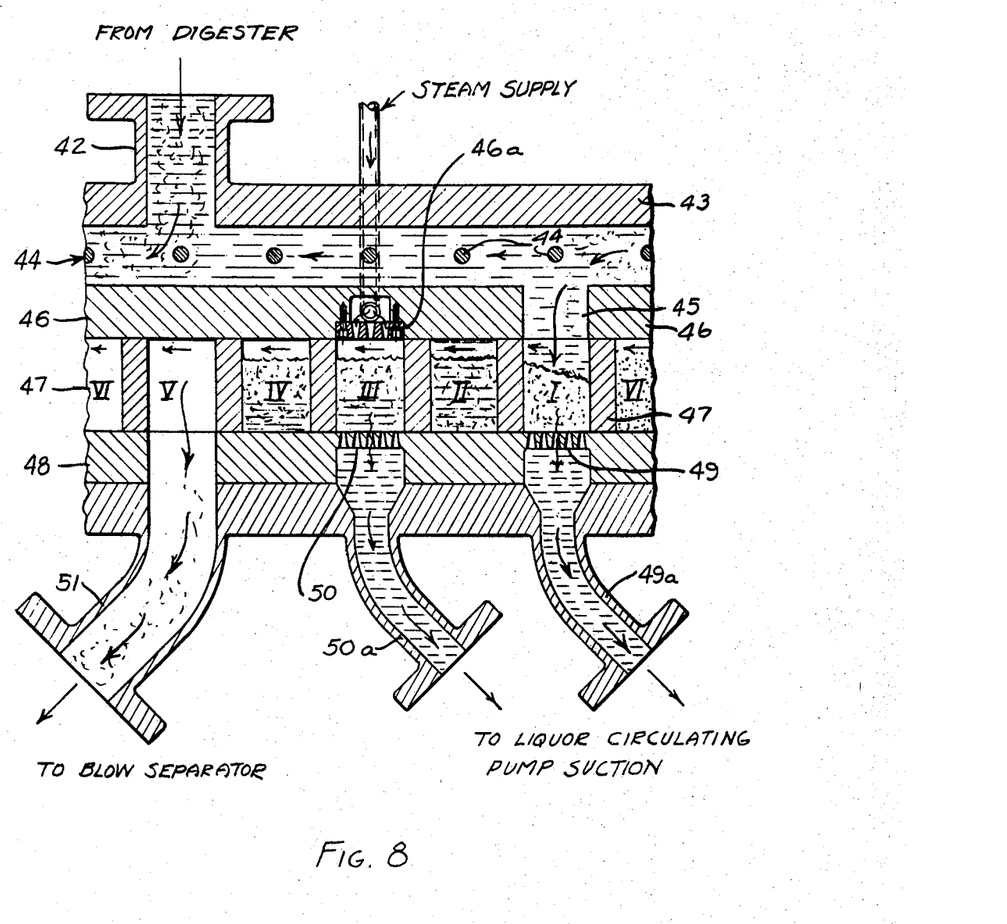
Fig. 8 is a developed view of the discharge valve illustrating the operations performed.

In Figure 7 is shown a preferred embodiment of my improved device serving as a cooked chip discharge mechanism. Its structure is essentially the same as that of Fig. 1 and its operation will be apparent from the following explanation in connection with Fig. 8 showing a developed view of the cooked chip discharging mechanism. Cooked chips and surrounding liquor flow through duct 42 into chip meter casing 43 and are transported by means of chip meter fingers 44 to opening 45 where they drop through port plate 46 into the pockets of valve disk assembly 47. The chip meter has less capacity than the pockets of the valve disk. Thus the pockets will never be completely filled. This, as in the raw chip feeding mechanism, Fig. 1, reduces the tendency to crush and shear the chips and also reduces wear on the pocket edges and port plates. In the embodiment shown there are only six pockets in the disk assembly with positions I to VI identifying the six positions. The chips from duct 45 drop into a valve pocket in position I. Excess liquor, used in transporting the chips, flows through the strainer section 49 in bottom port plate 48 to conduit 49a and goes on to the suction of the liquor circulating pump not shown. In position II the pocket, filled with liquor and chips, is sealed. In position III liquor is allowed to drain from the chips through another strainer section 50 in bottom port plate 48 into conduit 50a and thence also to the suction of the circulating liquor pump. To assist removal of the liquor, steam may be admitted through a strainer 46a in top port plate 46 as shown. Any portion of or all the liquor may thus be removed in position III by varying the amount of steam so admitted. Ordinarily only enough is allowed to remain and be discharged with the chips to keep the liquor in the digester from rising above the desired level. Thus the maximum amount of heat in the liquor is retained since no excess liquor is removed and allowed to flash into steam. Position IV is a sealed space. In position V the cooked chips are blown from the pocket by the expansion of the steam contained therein. The rapidly expanding steam defibers the chips into pulp as occurs in the blowing of conventional batch digesters. The pulp is discharged through pipe 51 to a blow separator of conventional design, not shown. In position VI the pocket is sealed ready for re-entering the cycle.

Figure 9:
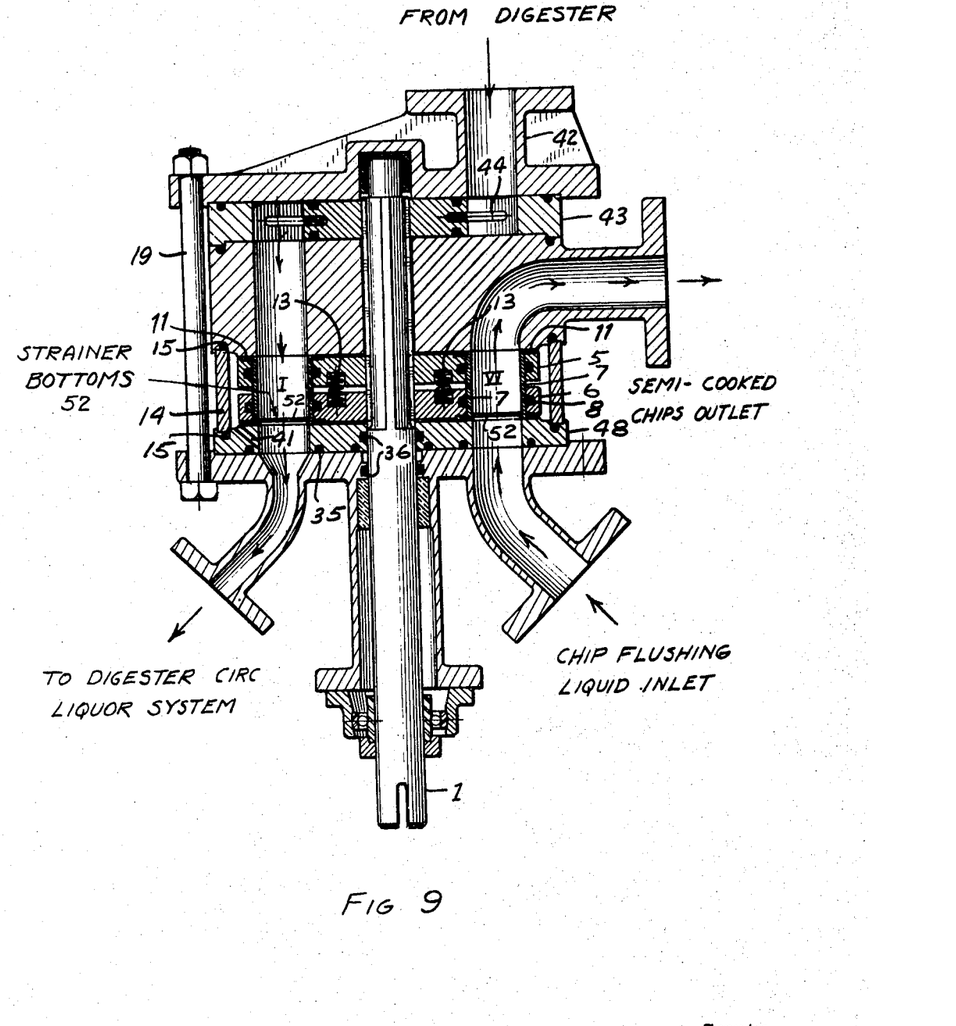
Fig. 9 is a view in vertical section of a modification suitable for the discharge of semi-cooked chips.
Figure 10:
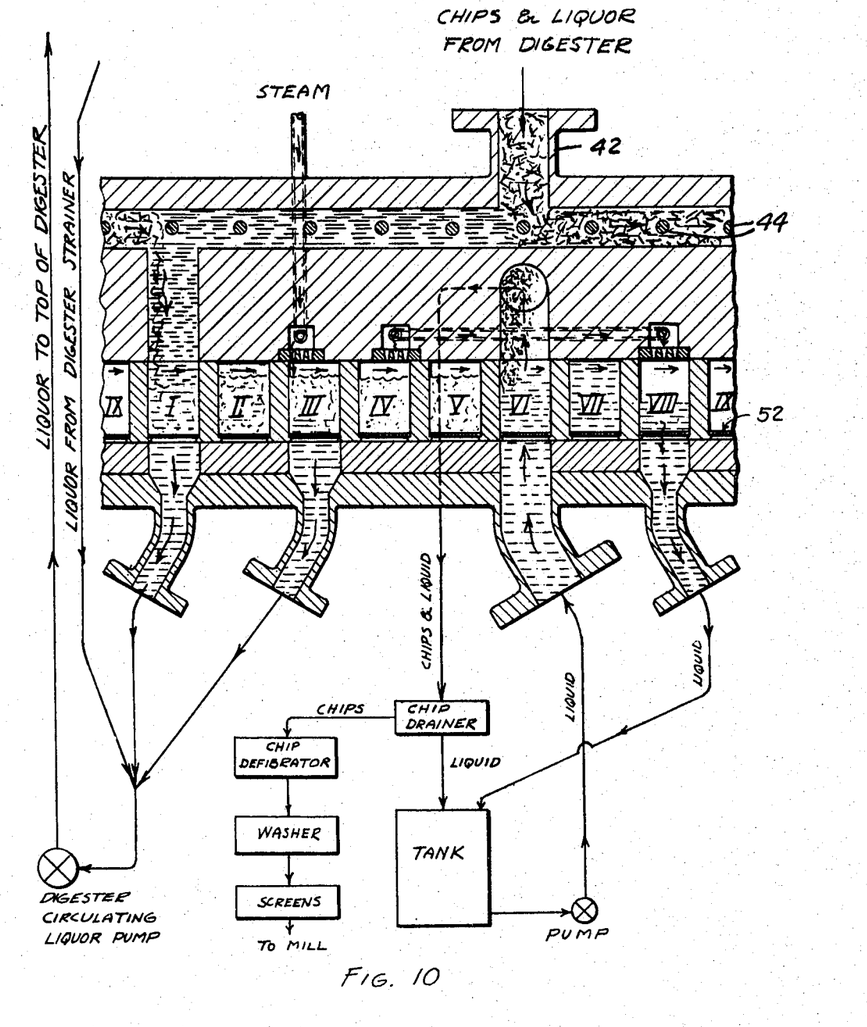
Fig. 10 is a developed view of same.

Fig. 9 shows a vertical section of a discharge mechanism for semi-cooked chips in which the chips can be transferred to an additional cooking process or discharged for mechanical defibering into pulp. The structural details are similar to Fig. 7. Fig. 10 shows a developed view of the valve together with a schematic flow diagram of a typical mechanical defibering system. This flow diagram is purely for purposes of illustrating the functioning of the valve. It will be noted that this valve disk assembly has nine pockets. The nine positions are numbered I to IX. It will be noted further that strainers 52 are provided near the bottom of each pocket.

To simplify the explanation of the operation of the valve each position will be listed with a description of the part of the operation occurring in that particular position, as follows:

Position I—Chips and liquor are received from chip meter into the pocket. Liquor flow continues on through strainer bottom in the pocket to suction of liquor circulating pump not shown.
Position II—Pocket sealed.
Position III—Liquor surrounding chips is drained out assisted by steam. This liquor also goes to suction of liquor circulating pump.
Position IV—Steam, in pocket and chips, relieved.
Position V—Pocket sealed.
Position VI—Chips flushed from pocket by means of liquor from tank and transported by the liquor to chip drainer.
Position VII—Pocket sealed and full of flushing liquor.
Position VIII—Liquor drained from pocket into tank, aided by steam released from position IV.
Position IX—Pocket sealed, empty except possibly for steam, and ready for reentering the cycle.

The embodiment of Figs. 9 and 10 is of advantage when it is desired to transfer the chips already cooked to a second digester as set forth in my copending application Serial No. 260,268. In such case, circulating cooking liquor from the second digester is used to flush the chips from the valve pockets in position VI, said liquor transporting the chips into the second digester. Liquor draining from the pockets in position VIII would go to the suction of the circulating liquor pump of the second digester. If the second digester operated at higher pressure, a direct steam connection as in position III would be required at position VIII. Steam discharged from position IV would then go to atmosphere.

Obviously, from the foregoing descriptions, this improved rotary disk mechanism is extremely flexible as regards the number and variety of operations which it can perform. Fig. 1 shows it as a chip feeding mechanism; Fig. 7 illustrates how it can be modified to discharge cooked chips; Fig. 9 shows a modification used for discharging semi-cooked chips or transferring semi-cooked chips to a second digester. From the second digester they could be transferred on to a third digester, etc. as required. Any number of pockets and ports can be provided to meet the particular service requirements.

Figure 11:
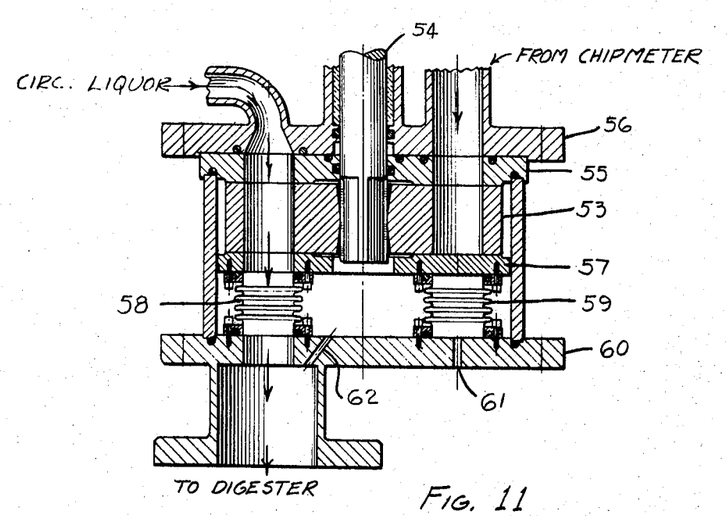
Fig. 11 is a view in vertical section showing a modification of the chip handling valve using a floating port plate with flexible bellows type port connectors.

A number of modifications can be made in the structure of the valve without losing the desirable operating characteristics. Fig. 11 shows a chip feeding mechanism similar to Fig. 1 with one of these modifications. The chip meter is not shown. In this case the rotating disk 53 is of solid construction but free to float up and down on splined shaft 54. The top port plate 55 is rigidly mounted in the casing 56. The bottom port plate 57 is restrained from rotating but is free floating up and down and held in contact with the disk 53 by the spring action of flexible bellows 58 and 59 and other bellows not shown. Bellows 58 and other bellows not shown also serve as flexible conduits between the port openings in port plate 57 and the bottom casing 60. Bellows 59 is used as a force balancing element, being connected to atmospheric pressure by conduit 61. Digester pressure is maintained inside the valve casing by means of conduit 62. This inside pressure would normally tend to exert considerable force on port plate 57 where lower or atmospheric pressure exists inside the valve pockets. Bellows 59 and other similar bellows, not shown, partially counteract this force; giving the same balanced force effect as obtained in the preferred design, Figs. 1, 7 and 9, and as explained previously.

Figure 12:
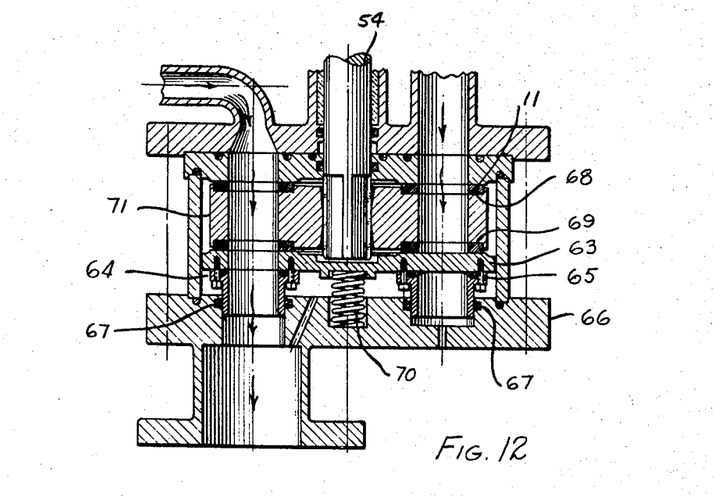
Fig. 12 is a view in vertical section showing a modification of the valve using the floating port plate with sleeve type port connections, and also the use of self-lubricating wear plates.

Fig. 12 illustrates another modification similar to that in Fig. 11 except that sliding sleeve type flexible connectors are used in place of flexible bellows. Bottom port plate 63 has attached to it sleeve elements 64 and 65 and others not shown. These fit into holes in bottom casing 66 with leakage prevented by rubber O-rings 67. These sleeve type connectors function exactly the same as the flexible bellows in Fig. 11, providing conduits from the openings in the bottom port plate to the bottom casing and thence as desired, and as force balancing elements. Graphite wear plates 68 and 69 are shown in this assembly to illustrate how they may be used when desirable. Spring 70 holds the floating port plate in contact with the valve disk 71.

Obviously in Fig. 11 and Fig. 12 both top and bottom port plates could be free-floating with the rotating valve disk rigidly attached to the shaft.

The fluid pressure inside the valve casing may be obtained from a number of sources. Ordinarily it would come from inside the digester by means of internal conduits as illustrated by conduit 41 in Fig. 1, or from other external connections to digester pressure. Where desirable this pressure could be supplied by entirely independent sources such as pumps, compressors, or from steam or water mains and the like, and the pressure could be varied to give optimum sealing and frictional characteristics.

Many other modifications could obviously be made without departing from the principles and features of this invention.

I claim:
1. A chip feeder for feeding chips into a digester maintained under superatmospheric pressure comprising a rotary valve element having circularly disposed chip carrying pockets therein, said element connecting a chip charging station adapted to be maintained under atmospheric pressure with a chip discharge station angularly displaced from said chamber and adapted to be maintained under the pressure of the digester, said pockets receiving chips from said charging station and delivering them to said discharge station, a chip transporting device for supplying chips to said chip charging station, and a plurality of stations through which said valve element passes including the station at which the chips are admitted to a pocket, a station at which the contents of a pocket are discharged into the digester and at which said pocket is filled with steam from the digester, and a station intermediate said stations, a duct connecting said steam admitting station to said intermediate station thereby to steam said chips, and a duct to vent said intermediate station.

2. A material handling device for feeding a divided solid material from a first region of one fluid pressure to a second region of a different fluid pressure comprising in combination a substantially pressure-tight casing having a top port plate, a bottom port plate, a valve rotor rotatably mounted between said plates and comprising a pair of superimposed independently mounted disk-like elements adapted to make substantially pressure-tight contact with said port plates, said rotor having a plurality of circularly disposed open-ended passages extending from face to face thereof and constituting pockets for the transport of said material, sleeve means for sealing said passages while permitting a limited movement of said disk-like elements toward and away from one another, a shaft upon which said rotor is mounted with freedom of axial movement thereon, means for maintaining a desired fluid pressure in said casing, said port plates being provided with charging and discharging ports communicating respectively with material charging and discharging stations whereby said material is received in a pocket at one station under the pressure of said first region and is transported to said discharge station at the pressure of said second region.

3. The device according to claim 2 in which the effective sealing boundary between the relatively rotatable parts surrounding each pocket defines such an area that the thrust due to fluid pressure within the casing is substantially balanced by the thrust due to pressure inside any of said pockets irrespective of the pressure therein.

4. A material-handling device for feeding divided solid material from a first region under one fluid pressure to a second region under a different fluid pressure comprising, in combination, a valve rotor comprising at least one rotary plate member and having a plurality of circularly disposed open-ended passages extending from face to face thereof and constituting pockets for the transport of said material, a drive shaft for said rotor coaxial therewith, a pair of non-rotary plate members having ports therein and constituting port plates between which said rotor is adapted to turn, said rotary and non-rotary plate members having bearing relation to one another, means supporting at least two of said plate members with freedom for axial movement, spring means acting axially against the axially movable plate members to urge them together, casing means having inlet and outlet openings and formed so as to define a sealed enclosure with respect to the axially movable plate members whereby variation of pressure in said enclosure causes a corresponding variation in bearing pressure of plate members having axial movement, means for maintaining fluid pressure in said enclosure substantially equivalent to that of the region of higher fluid pressure, said pockets receiving one after another the material under one fluid pressure at a charging station, transporting it to a discharging station and there delivering it to a said second region under a different fluid pressure.

5. The device according to claim 4, in which the valve rotor comprises two axially movable rotary plate members which are superimposed within said sealed enclosure, each member having a plurality of circularly disposed open-ended passages as described with said passages of one member in registry with those of the other, sleeves lining said passages and extending substantially from face to face of the rotor, means for maintaining said sleeves in substantially leak-tight relation with the rotor plate members while permitting relative movement of the plate members toward and away from one another, said spring means mentioned being disposed so as to urge said last mentioned plate members apart.

6. The device according to claim 4, in which the valve rotor comprises a single axially movable rotary plate member having a plurality of circularly disposed open-ended passages extending from face to face thereof, said rotor being disposed between the two non-rotary port plates one of which is axially movable, and an extensible material-conducting means connecting a port of said axially movable port plate through said sealed enclosure.

7. The device according to claim 4, in which the valve rotor comprises a single axially movable rotary plate member having a plurality of circularly disposed open-ended passages extending from face to face thereof, said rotor being disposed between two non-rotary port plates one of which is axially movable, and extensible material-conducting means in the form of flexible bellows connecting a port of said axially movable port plate through said sealed enclosure.

8. The device according to claim 4, in which a plurality of sealed zones are provided through which said pockets are caused to travel.

9. The device according to claim 4, in which means are provided for feeding said solid material to said charging station at a rate less than that required to completely fill said pockets.

10. The device according to claim 4, including strainer elements for said pockets for separating therefrom fluids associated with said divided solid material.

11. The device according to claim 4, together with means for feeding said solid material to said valve rotor at a rate less than the capacity of said pockets to transport the same.

References Cited in the file of this patent

UNITED STATES PATENTS

| Number | Name | Date |
|---|---|---|
| 748,414 | Passburg | Dec. 29, 1903 |
| 1,396,859 | Long | Nov. 15, 1921 |
| 2,151,511 | Hagen | Mar. 21, 1939 |
| 2,209,991 | McGill | Aug. 6, 1940 |
| 2,209,992 | McGill | Aug. 6, 1940 |
| 2,209,993 | McGill | Aug. 6, 1940 |
| 2,314,031 | Colburn | Mar. 16, 1943 |
| 2,459,180 | Richter | Jan. 18, 1949 |
| 2,585,472 | Kennedy | Feb. 12, 1952 |